United States Patent [19]
Gasch

[11] Patent Number: 5,188,194
[45] Date of Patent: Feb. 23, 1993

[54] DRIVE ASSEMBLY FOR A FOUR WHEEL DRIVE VEHICLE

[75] Inventor: Christian Gasch, Lohmar, Fed. Rep. of Germany

[73] Assignee: Viscodrive GmbH, Lohmar, Fed. Rep. of Germany

[21] Appl. No.: 700,528

[22] Filed: May 14, 1991

[30] Foreign Application Priority Data

May 15, 1990 [DE] Fed. Rep. of Germany ....... 4015552

[51] Int. Cl.⁵ .................. B60K 17/344; F16C 3/00
[52] U.S. Cl. ................................. 180/248; 464/180
[58] Field of Search ............. 180/247, 248, 378–382, 180/233; 464/24, 180, 178, 136

[56] References Cited

U.S. PATENT DOCUMENTS

| | | | |
|---|---|---|---|
| 4,551,116 | 11/1985 | Krude | 464/178 X |
| 4,771,842 | 9/1988 | Mishio et al. | 464/180 X |
| 5,016,724 | 5/1991 | Steinhagen et al. | 180/248 X |

FOREIGN PATENT DOCUMENTS

| | | |
|---|---|---|
| 3522269 | 1/1986 | Fed. Rep. of Germany . |
| 3708054 | 10/1987 | Fed. Rep. of Germany . |
| 3916144 | 11/1989 | Fed. Rep. of Germany . |
| 3917754 | 12/1989 | Fed. Rep. of Germany . |

Primary Examiner—Charles A. Marmor
Assistant Examiner—Florian Zeender
Attorney, Agent, or Firm—Harness, Dickey & Pierce

[57] ABSTRACT

The invention relates to a drive assembly for driving the wheels of a four wheel drive vehicle. The drive assembly comprises a propeller shaft 8 consisting of two portions 9, 10. Furthermore, the propeller shaft 8 comprises a viscous coupling 14 arranged at one end of the intermediate bearing 13 and a joint 15 arranged at the other end of the intermediate bearing 13 and non-rotatingly connected to the viscous coupling 14. Such a propeller shaft 8 ensures quiet running of the bearings of the assembly and prevents the joint and viscous coupling from influencing each other.

15 Claims, 2 Drawing Sheets

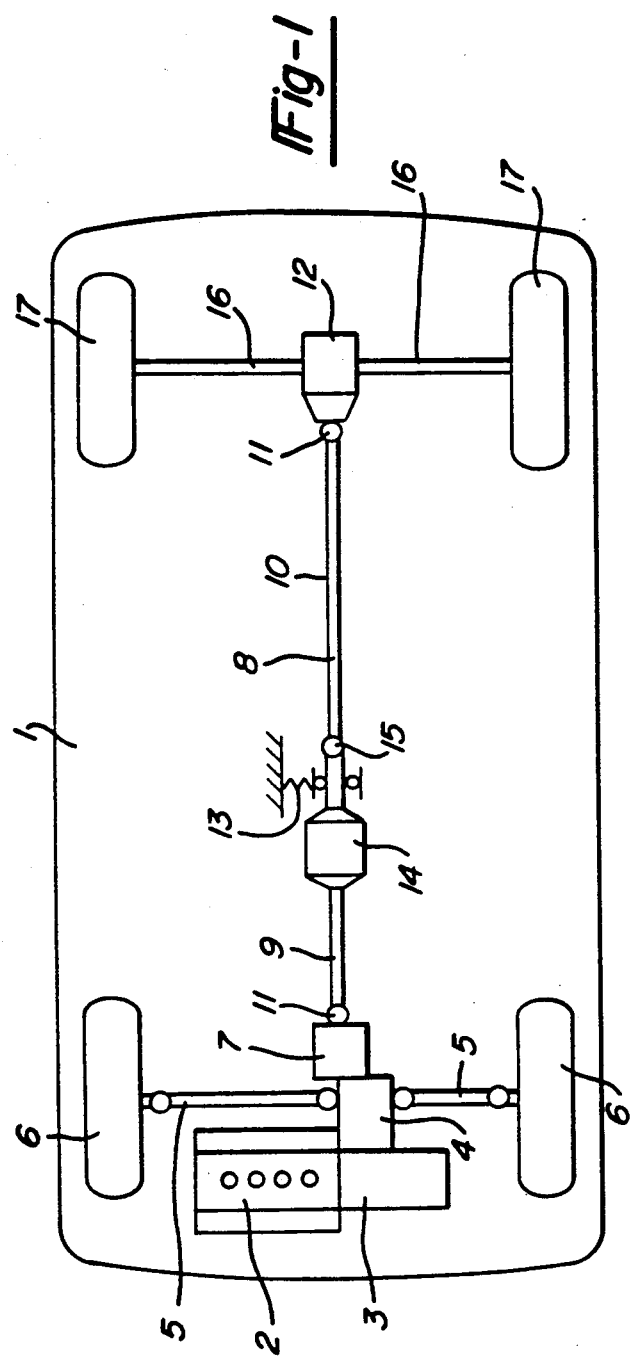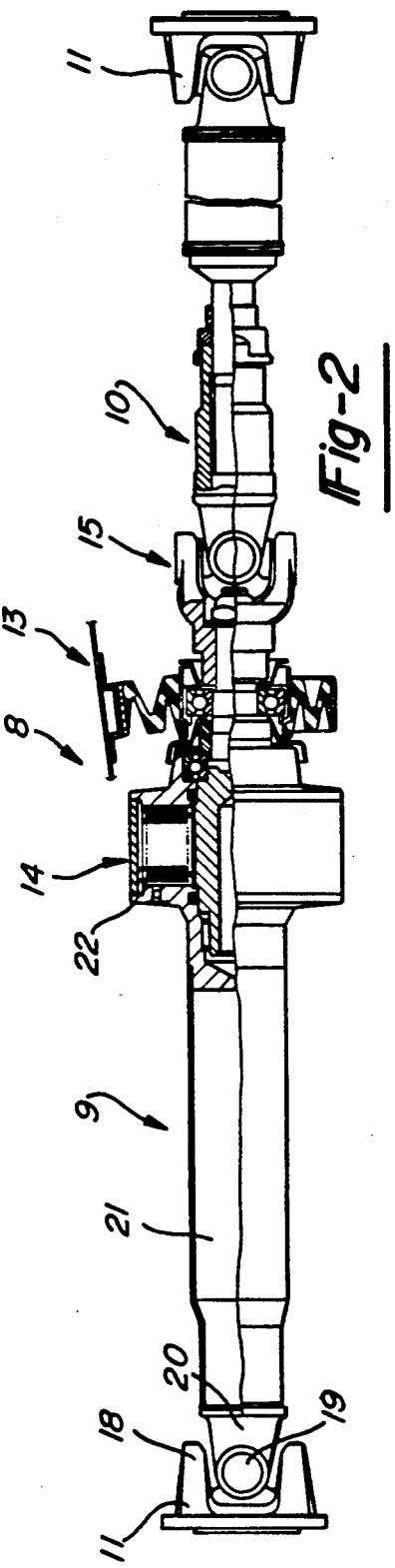

DRIVE ASSEMBLY FOR A FOUR WHEEL DRIVE VEHICLE

FIELD OF THE INVENTION

The invention relates to a drive assembly for driving the wheels of a four wheel drive vehicle, comprising a propeller shaft which connects the drive of the permanently driven wheels with the input of the intermediate differential, which, as an integrated part, comprises a viscous coupling consisting of coupling parts in the form of a coupling housing and a coupling hub, and coupling plates arranged in the inner space formed therebetween and non-rotatingly connected in a certain sequence to one of the coupling parts, as well as a viscous medium at least partially filling the remaining inner space, and which propeller shaft, via joints arranged at its ends, is connected to the drive and the input of the intermediate differential.

BACKGROUND OF THE INVENTION

Description of the Related Art

Such a drive assembly is known from DE 39 16 144 A1 where the coupling hub of the viscous coupling at the same time forms the outer part of a tripode joint. The inner part of the tripode joint, i.e. the tripode star including the rollers rotatably and sidably arranged thereon is directly associated with the output of a distributing drive. Between the distributing drive and the drive driving the wheels of the permanently driven front axle there exists a driving connection. The direct coaxial arrangement of the viscous coupling and the integration of its coupling hub into the joint are disadvantageous in that the two components influence each other. During the transmission of torque the joint heats up, with such heat being introduced into the viscous coupling directly, i.e. the viscous coupling is heated up by the joint, and vice versa, the heat developing in the viscous coupling flows into the joint.

However, to a considerable extent, the torque characteristics of the viscous coupling depend on the temperature rise of the fluid contained therein. With an increasing temperature, the viscosity of the fluid is reduced, which is followed by a reduction in the torque transmitted. As the temperature rises further, the filling level of the viscous coupling rises and thus the amount of transmittable torque. If at high absolute speeds, the viscous coupling is heated up by a joint, it is possible for the viscous coupling to transmit torque at a time when this is not desirable. With such an arrangement, the torque characteristics of the viscous coupling move into an unwanted range.

There is a further disadvantage in that the viscous coupling represents a considerable mass which, as a result of the special characteristics of the tripode joint relative to the fixed tripode star, carries out a cyclically eccentric movement around the joint centre. At high speeds, this leads to out-of-balance.

BRIEF DESCRIPTION OF THE PRESENT INVENTION

It is the object of the present invention to propose a drive assembly in the case of which the viscous coupling is integrated into the propeller shaft in such a way that mutual influencing of joint and viscous coupling is excluded while, additionally, ensuring quiet running of the propeller shaft.

In accordance with the invention, the objective is achieved in that the propeller shaft consists of several propeller shaft portions connected to each other via a joint, that an intermediate bearing supporting the propeller shaft on the floor assembly of the vehicle is arranged so as to immediately adjoin a joint connecting two of the propeller shaft portions and that the viscous coupling is arranged so as to immediately adjoin the end of the intermediate bearing facing away from the joint, that one of the two coupling parts is provided with a journal which is supported in the intermediate bearing and projects therefrom in the direction of the joint subsequently arranged at the other end of the intermediate bearing, with the joint being non-rotatingly attached to the projecting journal and that the other coupling part is non-rotatingly connected to the shaft portion arranged at the end of the intermediate bearing facing away from the joint immediately adjoining the intermediate bearing.

The advantage of this arrangement is that because the viscous coupling and intermediate bearing are arranged so as to be directly adjoining, quiet running is ensured. Furthermore, by inserting the viscous coupling, the vibration and resonance behaviour of the propeller shaft is advantageously influenced. The joint and viscous coupling do not mutually influence each other.

The multi-component design of a propeller shaft via which the rear wheels of a four wheel drive vehicle are driven and the support of such a propeller shaft in an intermediate bearing, with a joint adjoining the intermediate bearing are known from DE 35 22 269 A1.

In a preferred embodiment, the bearing arrangements are such that the coupling hub of the viscous coupling guided out of the first coupling part in the form of the coupling housing and forming the second coupling part comprises the journal via which it is supported in the intermediate bearing and non-rotatingly connected to the joint arranged at the other end of the intermediate bearing. The coupling housing of the viscous coupling is supported on the coupling hub.

Particularly advantageous connecting conditions are obtained if one end wall of the coupling housing of the viscous coupling is provided with a central shoulder whose outer face forms a connecting seat for the intermediate tube of the shaft portion.

This shoulder may comprise a central bore into which the coupling hub projects, thereby providing an increased support base for the coupling housing on the coupling hub.

According to a further embodiment of the invention it is proposed that the coupling hub should be designed to be hollow towards the coupling housing and in the form of a solid journal towards the joint and that the solid journal should be provided with seat faces for a bearing of the coupling housing, with a seat face for the intermediate bearing and, towards its end, with teeth for non-rotatingly connecting a joint part of the joint.

This means that the coupling hub, at the same time, serves as a joint carrier and that, overall, the connections in the region of the intermediate bearing between the two shaft portions are simplified.

To support the coupling housing on the coupling hub it is proposed to arrange a needle bearing between the shoulder and the coupling hub and a ball bearing in the region towards the intermediate bearing.

The propeller shaft preferably consists of two shaft portions and an intermediate bearing. Propeller shafts with several propeller shaft portions are also conceivable, but with the viscous coupling being associated with one of the shaft portions only and with the connections in the region of the intermediate bearing being designed in accordance with the invention.

In a further embodiment it is proposed that the joint adjoining the intermediate bearing should be a universal joint whose joint yoke is slid on to, and attached to, the coupling hub. Universal joints are particularly advantageous in respect of heat development during the transmission of torque provided certain sizes of the articulation angles are not exceeded.

Finally, according to a further proposal, the joint yoke axially fixes the inner race of the roller bearing of the intermediate bearing and, via a spacing bush, the inner race of the ball bearing on the coupling hub, thereby creating easy assembly conditions.

A general advantage of the solution as proposed by the invention consists in that the integration of the viscous coupling into the propeller shaft permits a vehicle with permanent four wheel drive to be re-equipped so as to obtain a four wheel drive vehicle in the case of which the wheels which are not permanently driven may be connected via the viscous coupling if slip occurs at the permanently driven wheels, the advantage of such a drive assembly being that any torsion in the driveline, especially when maneuvering or parking the vehicle, can be avoided.

Viscous couplings for driving motor vehicles are known in themselves, for instance from GB-PS 1 357 106.

A preferred embodiment is illustrated in the drawing and explained with the help of a diagram of a drive assembly of a motor vehicle.

GENERAL DESCRIPTION OF THE DRAWINGS

FIG. 1 shows a four wheel drive vehicle having a drive assembly in accordance with the invention.

FIG. 2 shows the propeller shaft in an enlarged scale.

DESCRIPTION OF A PREFERRED EMBODIMENT

Figure 3:
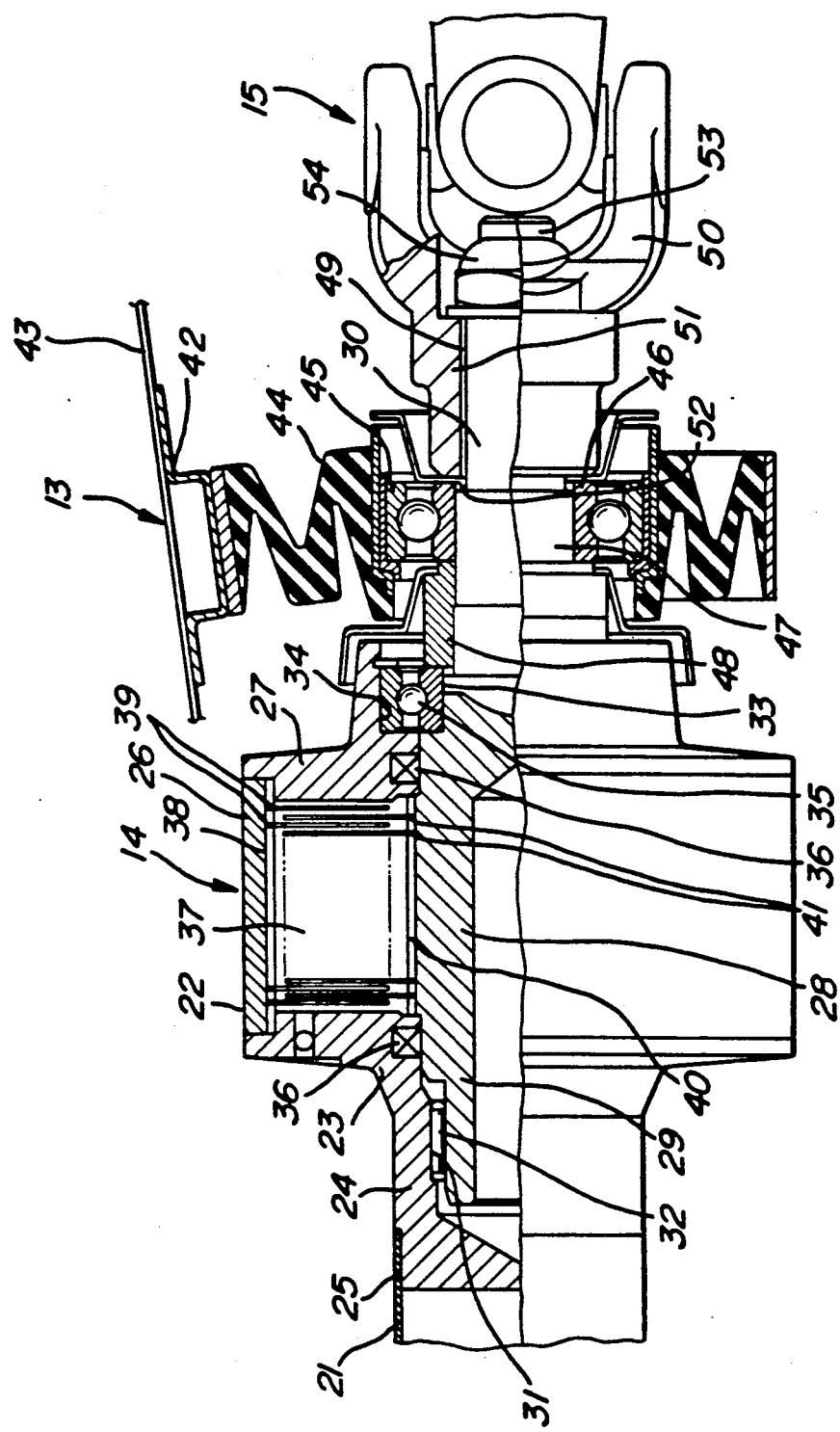
FIG. 3 shows the mutual association and support of the viscous coupling, intermediate bearing and joint in a scale increased further.

The vehicle 1 illustrated in FIG. 1 is driven by an engine 2 and a gearbox 3. From the gearbox 3, the front wheels 6 are driven via the front axle differential 4 and the sideshafts 5. Via a distributing drive 7 and a propeller shaft 8 the torque is passed on to the rear wheels 17 of the motor vehicle 1. The propeller shaft 8 comprises a first shaft portion 9 with a joint 11 by means of which it is connected to the distributing drive 7. The propeller shaft 8 further comprises a second shaft portion 10 which, via joint 11, is connected to the intermediate differential 12 for driving the rear wheels 17 via rear sideshafts 16. The two shaft portions 9, 10 are connected to each other via a viscous coupling 14 and a further joint 15. Between the viscous coupling 14 and the further joint 15 there is arranged an intermediate bearing 13 which is fixed to the floor assembly of the motor vehicle 1, for example. The design of the propeller shaft 8 and especially the mutual association of the intermediate bearing 13, the viscous coupling 14 and the further joint 15 are explained in more detail in FIGS. 2 and 3.

FIG. 2 shows that the first joint 11 connecting the first shaft portion 9 to the distributing drive 7 is designed as a universal joint. The universal joint comprises a flange yoke 18 fixed to the output flange of the distributing drive 7. Via a joint cross member 19, a tube connecting yoke 20 is connected to the flange yoke 18 so that it can be articulated. The tube connecting yoke 20 is attached to the intermediate tube 21 which is non-rotatingly connected to the housing 22 of the viscous coupling 14. The viscous coupling 14 is followed by the intermediate bearing 13. At the other end of the intermediate bearing 13 there is provided a further joint 15 in the form of a universal joint which is associated with the shaft portion 10. The shaft portion 10 is provided with a joint 11 by means of which it is connected to the input end of the intermediate differential 12 for the rear wheels 17.

FIG. 3 illustrates the mutual association of the viscous coupling 14, the intermediate bearing 13 and the further joint 15. The viscous coupling 14 comprises a coupling housing 22 which is provided with a first end wall 23 having a central shoulder 24 with a bore 31, and with a second end wall 27. The shoulder 24, on its outer face, comprises a seat face 25 for the intermediate tube 21 associated with the first shaft portion 9 of the propeller shaft 8. The two end walls 23, 27 are connected to the housing casing 26. The coupling hub 28 is rotatably supported in the coupling housing 22. The coupling hub 28 comprises a hollow portion 29 associated with the coupling housing 22, and a solid journal 30 associated with the intermediate bearing 13 and the further joint 15. To be able to support the coupling hub 28, the bore 31 in the shoulder 24 is designed as a running face for a needle bearing 32 which is supported on the outer face of the hollow portion 29 of the coupling hub 28.

Furthermore, the coupling hub 28 is supported in the end wall 27 of the coupling housing 22 via a ball bearing 35. The inner race of the ball bearing 35 is held on a stepped seat face 33 of the solid journal 30 of the coupling hub 28. The outer race of the ball bearing 35 is accommodated in a bore 34 of the end wall 27 and held via a securing ring. The interior 37 of the viscous coupling 14 formed between the coupling housing 22 and the coupling hub 28 is sealed via seals 36. The coupling housing 22, in its casing 26, comprises teeth 38 which hold annular outer plates 39 in such a way that they are non-rotating and possibly axially spaced. The coupling hub 28, on its outer face, comprises teeth 40 holding annular inner plates 41 in such a way that they are non-rotating and possibly axially movable.

The inner plates 41 and outer plates 39 are arranged alternately in a certain sequence and overlap at least partially. The remaining part of the interior 37 of the viscous coupling 14 not occupied by inner and outer plates 39, 41 is at least partially filled by a viscous medium, for example silicone oil.

The intermediate bearing 13 is arranged on the solid journal 30 of the coupling hub 28 of the viscous coupling. The intermediate bearing comprises the bearing housing 42 fixed to the vehicle floor assembly 43 (indicated only), the bearing member 44 which is made of rubber for example and which serves resilient support and vibration damping purposes, and the roller bearing 45. The inner race 46 of the roller bearing 45 is arranged on the seat face 47 of the solid journal 30. The roller bearing 35 is axially fixed on the seat face of the solid journal 30 via the spacing bush 48 positioned between the inner race of the ball bearing 35 and the inner race of the roller bearing 45. The spacing bush 48 may either serve for directly fixing the ball bearing 35, but it may also be axially pressurised through contact of the inner race 46 and fixed together therewith. The solid journal extends through the inner race 46 of the roller bearing 45. Its end projecting from the intermediate bearing 13 is provided with teeth 49, with the joint yoke 50 of the further joint 15 associated with the second shaft portion 10 being non-rotatingly slid on to the teeth 49 with its sleeve portion 51 whose bore is also provided with teeth. Furthermore, the solid journal 30, at its end pointing to the shaft portion 10, comprises a threaded journal 53 on to which it is possible to screw a nut 54 which tightens the sleeve portion 51 of the joint yoke 50 with its end face 52 against the inner bearing race 46 of the roller bearing 45. At the same time, this unit may be used for holding the ball bearing 35 on the coupling hub 28 via the spacing bush 48.

I claim:

1. A drive assembly for driving the wheels of a four wheel drive vehicle, comprising:
    a propeller shaft connecting a drive of permanently driven wheels with an input of an intermediate differential, a viscous coupling having a coupling housing, coupling hub, and coupling plates arranged in an inner space formed between the coupling housing and hub, said plates non-rotatingly connected in a desired sequence to one of the coupling housing and hub and a viscous medium at least partially filling the remaining inner space;
    first joints arranged at ends of said propeller shaft for connecting said shaft to the drive and the input of the intermediate differential;
    said propeller shaft including several propeller shaft portions connected to each other via a second joint;
    an intermediate bearing supporting the propeller shaft on a floor assembly of the vehicle, said bearing having two ends and being arranged adjacent said second joint connecting two of the propeller shaft portions;
    said viscous coupling being arranged adjacent the end of the intermediate bearing facing away from the second joint, one of the coupling housing and hub being provided with a journal supported in said intermediate bearing, said journal projecting in the direction of the second joint subsequently arranged at the other end of the intermediate bearing, said second joint being non-rotatingly attached to the projecting journal of said one of the coupling housing and hub and the other coupling housing and hub being non-rotatingly connected to the shaft portion, and said other coupling housing and hub arranged at the end of the intermediate bearing facing away from the second joint immediately adjacent the intermediate bearing.

2. A drive assembly according to claim 1, wherein said coupling hub includes the journal supported in the intermediate bearing and being non-rotatingly connected to the second joint arranged at the other end of the intermediate bearing.

3. A drive assembly according to claim 2, wherein said coupling housing is supported on the coupling hub.

4. A drive assembly according to claim 1, wherein an end wall of the coupling housing is provided with a central shoulder with an outer face forming a connecting seat for an intermediate tube of the associated shaft portion.

5. A drive assembly according to claim 4, wherein said shoulder includes a central bore into which projects a portion of the coupling hub.

6. A drive assembly according to claim 1, wherein said coupling hub includes a hollow portion towards the coupling housing and a solid journal towards the second joint, said solid journal including a first seat face for a bearing of the coupling housing, a second seat face for the intermediate bearing, and, towards its end, teeth for non-rotatingly connecting a joint part of the second joint.

7. A drive assembly according to claim 2, wherein said coupling housing being supported on the coupling hub via a needle bearing arranged between a shoulder and the coupling hub, while being supported relative to the intermediate bearing via a ball bearing.

8. A drive assembly according to claim 1, wherein said second joint adjoining the intermediate bearing is a universal joint with a joint yoke slid on to, and attached to, the coupling hub.

9. A drive assembly according to claim 8, wherein said joint yoke axially fixes an inner race of a roller bearing of the intermediate bearing and a spacing bushing on the journal axially fixes an inner race of a ball bearing on the coupling hub.

10. A drive assembly according to claim 2 wherein said second joint adjoining the intermediate bearing is a universal joint with a joint yoke slid on to, and attached to, the coupling hub.

11. A drive assembly according to claim 3 wherein said second joint adjoining the intermediate bearing is a universal joint with a joint yoke slid on to, and attached to, the coupling hub.

12. A drive assembly according to claim 4 wherein said second joint adjoining the intermediate bearing is a universal joint with a joint yoke slid on to, and attached to, the coupling hub.

13. A drive assembly according to claim 5 wherein said second joint adjoining the intermediate bearing is a universal joint with a joint yoke slid on to, and attached to, the coupling hub.

14. A drive assembly according to claim 6 wherein said second joint adjoining the intermediate bearing is a universal joint with a joint yoke slid on to, and attached to, the coupling hub.

15. A drive assembly according to claim 7 wherein said second joint adjoining the intermediate bearing is a universal joint with a joint yoke slid on to, and attached to, the coupling hub.

* * * * *